United States Patent [19]

Johansson

[11] 4,300,035
[45] Nov. 10, 1981

[54] WELDING APPARATUS WITH TIME INTERVAL CONTROL

[75] Inventor: Rune L. Johansson, Älvängen, Sweden

[73] Assignee: Thermal Dynamics Corporation, West Lebanon, N.H.

[21] Appl. No.: 43,606

[22] Filed: May 29, 1979

[30] Foreign Application Priority Data

May 30, 1978 [SE] Sweden ............................ 7806255

[51] Int. Cl.³ .............................................. B23K 9/10
[52] U.S. Cl. ............................................... 219/130.21
[58] Field of Search .................... 219/137 PS, 130.51, 219/137.71, 130.21, 130.32, 130.33, 130.1

[56] References Cited

U.S. PATENT DOCUMENTS

| 3,136,884 | 6/1964 | Glenn et al. | 219/130.1 |
| 3,250,894 | 5/1966 | Manz | 219/137.71 |
| 3,627,975 | 12/1971 | Goto | 219/137.71 |
| 4,000,374 | 12/1976 | DeKeyser | 219/137.71 |
| 4,020,320 | 4/1977 | Pijls et al. | 219/137 PS |

FOREIGN PATENT DOCUMENTS

| 2342710 | 8/1973 | Fed. Rep. of Germany . |
| 2546732 | 4/1977 | Fed. Rep. of Germany . |
| 341584 | 1/1972 | Sweden . |
| 7501230 | 10/1977 | Sweden . |

*Primary Examiner*—C. C. Shaw
*Attorney, Agent, or Firm*—Sughrue, Mion, Zinn, Macpeak and Seas

[57] ABSTRACT

An apparatus for short-arc welding comprises a controllable current source, means for controllably feeding a consumable wire electrode to the weld location, and a control unit for automatically adjusting the current source in dependence upon the welding sequence. The current source is arranged to provide welding periods divided into short-circuit intervals, arc intervals and optionally also rest intervals. For the purpose of automatically adjusting the welding sequence to changes in the supply of electrode material to the weld location, the control unit includes means for adjusting the power output delivered by the current source as a predetermined function of the duration of at least one of said intervals in a sequence of welding periods.

19 Claims, 4 Drawing Figures

WELDING APPARATUS WITH TIME INTERVAL CONTROL

BACKGROUND OF THE INVENTION

This application is related to a copending and simultaneously filed application of the same title and same inventor and identified by Ser. No. 043,577 filed May 29, 1979.

The present invention relates to an apparatus for short-arc welding of the kind which includes a controllable current source, means for controllably feeding a wire-like consumable electrode comprising additive material to the weld location, and a control unit for automatically adjusting the current source in dependence upon the welding sequence, said current source being arranged to provide welding periods divided into short-circuit intervals, arc intervals and optionally also rest intervals.

In short-arc welding operations, the additive material is fed to the welding zone in the form of a continuously advanced wire through which the welding current also flows. One characteristic of short-arc welding is that the wire electrode is brought into direct contact with the weld location at closely following points of time, so-called short-circuit intervals, and short circuits the welding current circuit until the outermost end of the wire has melted. Each short-circuit interval is followed by a so-called arc interval, during which an arc burns between the outermost end of the wire and the weld location. The arc interval can be interrupted, either spontaneously as a result of the arc being extinguished due to the wire again short circuiting the said current circuit, or because the power is too low to maintain the arc, or the arc may be extinguished positively by automatically interrupting the supply of current by means of a control unit for the current source prior to the entry of the short-circuiting state. In the two latter cases there is obtained a so-called rest interval, during which current to the weld location is broken. The short-arc welding sequence is thus pulse-like or periodic, each welding period comprising a short-circuit interval and an arc interval, and optionally also a rest interval.

When short-arc welding, it is necessary to be able to adjust the supply of additive material in dependence upon the welding conditions, including the nature of the objects to be welded. However, one problem encountered with short-arc welding apparatus used until now has been that variations in the supply of additive material require the parameters of the current source to be adjusted, which adjustments have hitherto been made manually, there being required a degree of expertise on the part of the welder if optimal weld results are to be obtained. In addition there has been used in certain cases means for measuring the speed at which the wire-electrode feeding device operates to feed the additive wire to the weld location, and to automatically compensate the setting of the current source in response to the measured speed. However, as a result of slipping and other disturbances in the wire-feeding device, momentary variations may occur in the supply of additive material during a welding operation, these variations and interruptions being harmful to the weld result and rendering it impossible to continuously correct the source of welding current, either manually or with the automatic devices hitherto used.

SUMMARY OF THE INVENTION

An object of the present invention is to provide a novel and improved apparatus for short-arc welding in which the aforementioned problems are at least substantially eliminated.

To this end it is proposed in accordance with the invention that, in an apparatus of the kind described in the introduction, the control unit for automatically adjusting the welding sequence to changes in the supply of additive material includes means for adjusting the power output delivered by the current source as a given function of the duration of at least one of said intervals in a sequence of welding periods. In this way the need of such adjustments to the current source which require expertise on the part of the welder are avoided and at the same time, the need for expensive and mechanically delicate means for directly measuring the speed of the wire-feeding device is obviated. Thus, errors due to operator misjudgment and also due to slipping, etc., of the wire in the wire-feeding device are eliminated.

In the apparatus according to the invention, the power output of the current source can be controlled during the short-circuit intervals and/or the arc intervals in a manner such that said output is automatically adjusted to changes in the supply of additive material, said changes either being caused purposely or unintentionally. The adjustments can be made by utilizing any one of the following principles:

(1) that the duration of the short-circuit intervals increases with increasing dimensions of the additive wire and the speed at which it is fed, and decreases with increasing power;

(2) that the duration of the arc intervals decreases with increasing additive wire dimensions and the speed at which the wire is fed, and increases with increasing power if the arc intervals merge directly with short-circuit intervals without intermediate rest intervals and decreases with increasing power when there are rest intervals;

(3) that the duration of spontaneously occurring rest intervals decreases with an increase in the dimension of the additive wire and the speed at which it is fed and increases with increasing power during the short-circuit intervals and/or the arc intervals;

(4) that the duration of rest intervals purposely created by means of a control unit decreases with an increase in the dimension of the additive wire and the speed at which it is fed and increases with increasing power during the short circuit intervals and/or arc intervals, provided that the duration of the arc intervals is not permitted to increase with increasing power during the short-circuit intervals and/or the arc intervals; and (5) that the total time of said periods decreases with an increase in the dimension of the additive wire and decreases with an increase in the speed at which said wire is fed and increases with increasing power during the short-circuit intervals and/or the arc intervals.

In accordance with a favorable embodiment of the invention, the control unit may include means for controlling the power output during the short-circuit intervals as a first function of the duration of said intervals, and means for controlling the power output during the arc intervals as a second function of the duration of said intervals and optionally also as a function of the duration of respective rest intervals following said arc intervals. In this way the relationship between the power outputs during the short-circuit intervals and the arc intervals can be readily adjusted in a simple manner such that the penetration of the additive material can be controlled.

In accordance with a further favorable embodiment of the apparatus according to the invention, when said apparatus is provided with means for positively creating a rest interval prior to each short-circuit interval, the control unit may include means for controlling the power output during the short-circuit intervals and arc intervals as a function of the duration of said rest intervals. In this way an extremely stable periodicity is readily obtained in the welding sequence, which facilitates control while at the same time eliminating the risk of the additive material wire being burned onto the welding nozzle.

Conveniently, the apparatus according to the invention is also provided with means for adjusting the duration of at least one of the short-circuit, arc and rest intervals as a function of the speed at which the additive material is fed to the weld location, whereby said intervals can be adjusted to provide substantially optimal welding properties.

Further, the control unit conveniently includes means for closing the current to the weld location at a given time after the occurrence of a short circuit, thereby ensuring that a satisfactory short circuit is obtained from the very beginning of each short-circuit interval.

Conveniently a capacitor is connected between the additive wire and the weld location in parallel with the welding-current path, to thereby maintain a voltage therebetween during enforced rest intervals. In this way, detection of a subsequent short-circuit interval is facilitated while the risk of splashing or spluttering is reduced during the transition between a short-circuit interval and an arc interval.

In order to obtain particularly accurate adjustment of the penetration of the additive material during a welding operation using the apparatus according to the invention, the said control unit may conveniently include means for adjusting the arc interval energy in a manner such that it constitutes a given function of the short-circuit interval energy.

Further, for the purpose of obtaining a more regular periodicity during a welding operation, the apparatus according to the invention advantageously exhibits means for causing the power output to increase substantially rectilinearly during the short-circuit intervals.

In order to better adapt the welding sequence to variations in the speed at which the additive material is fed to the weld location, the control unit may also include means for continuously adjusting the duration of the short-circuit intervals and/or the arc intervals in accordance with a desired function dependent upon said speed.

BRIEF DESCRIPTION OF THE DRAWINGS

So that the invention will be more readily understood and further features thereof made apparent, the invention will now be described with reference to the accompanying schematic drawing, in which.

DETAILED DESCRIPTION OF THE INVENTION

Figure 1:
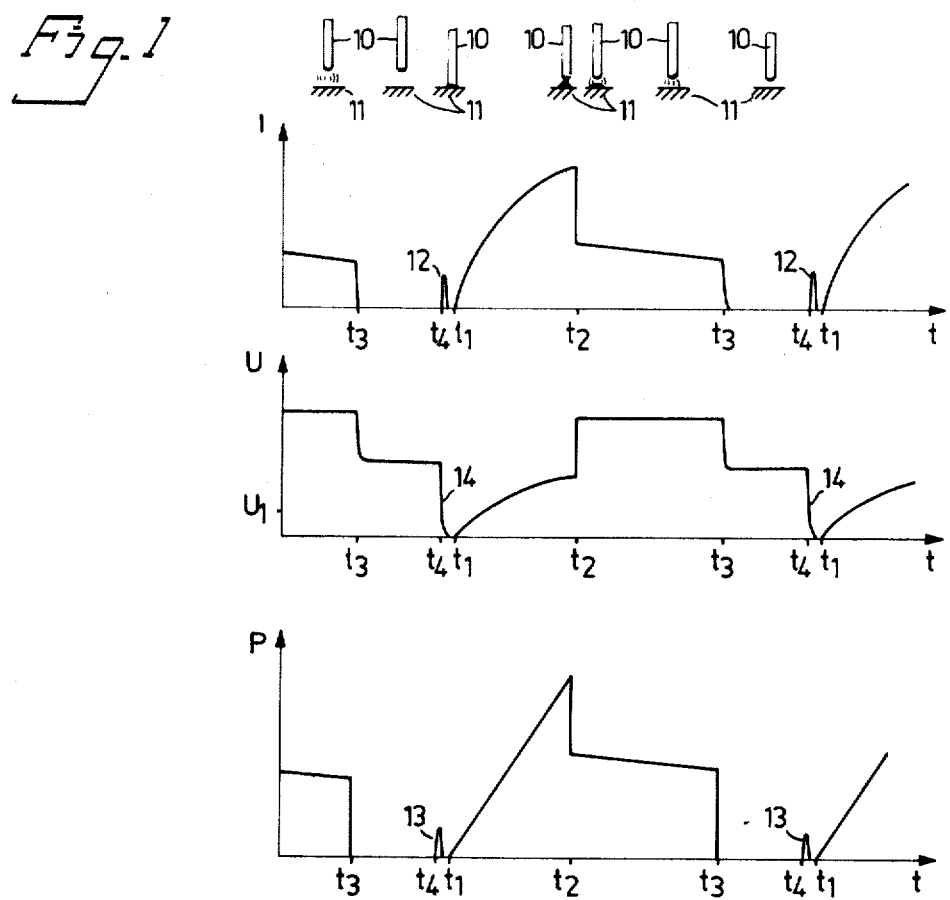
FIG. 1 illustrates curves which are typical of the current, voltage and power in short-arc welding.

In FIG. 1 there is shown the variation of current I, voltage U and power P as a function of the time t in a short-arc welding operation. These vary in a pulse-like fashion or periodically. Each welding pulse, as illustrated symbolically above the curves, where 10 references a consumable wire electrode and 11 references a workpiece, includes a short-circuit interval $t_1-t_2$ and an arc interval $t_2-t_3$. The arc intervals and the subsequent short-circuit intervals can be separated by rest intervals $t_3-t_1$. If rest intervals are employed, they can be positively introduced by continuously regulating the source of welding current, and the short-circuit interval can, if so desired, be introduced a short time $t_4-t_1$ after contact has been established between the wire 10 and the workpiece 11. When the welding apparatus includes a capacitor connected between the wire and the weld location in parallel with the welding-current path, the capacitor is discharged immediately when contact is established between the welding wire and the workpiece. Such a discharge is indicated in FIG. 1 by narrow current peaks and power peaks 12, 13 in the intervals $t_4-t_1$, and by the angle of inclination of the rear flank 14 of the voltage pulses in the time intervals $t_4-t_1$.

Figure 2:
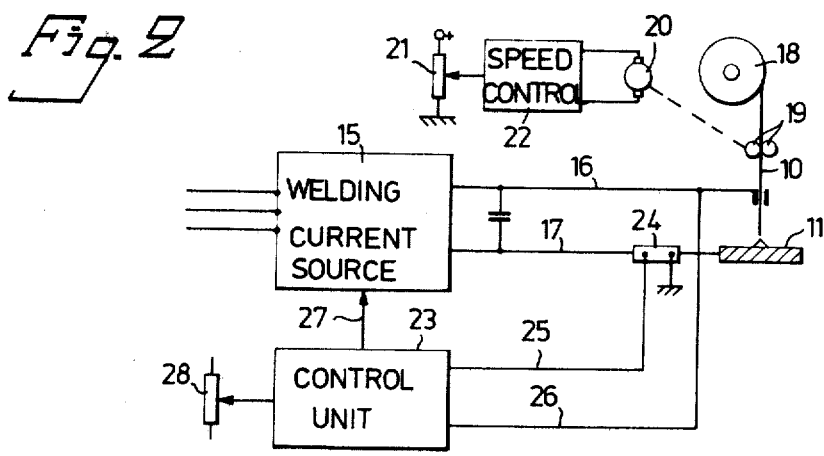
FIG. 2 illustrates a welding apparatus according to the invention.

In FIG. 2 the reference 15 identifies a controllable source of welding current supplied from a three-phase mains network, the outputs 16, 17 of which source are connected to a consumable wire electrode 10 and to a workpiece 11 respectively. The wire 10 is fed to the weld location from a storage reel 18 by means of a pair of feed rollers 19 driven by an electric motor 20 via a control means 21, 22. In this way, the desired rotary speed of the motor and consequently, the desired speed at which the wire is fed, can be manually adjusted in a manner known per se.

The reference 23 identifies generally a control unit to which signals corresponding to the welding current and to the welding voltage are constantly supplied through a current shunt 24, a line 25 and a line 26. The reference 27 identifies a line for conducting control signals to the current source 15, which signals in the embodiment hereinafter described control the power output of the current source 15. The current source may be of the quick-controllable type, as described in, for example, U.S. Pat. No. 4,152,759 issued May 1, 1979 and preferably as described in U.S. Pat. No. 4,159,409 issued June 26, 1979. Such a current source will also permit individual regulation of each welding period and also the different intervals $t_1-t_2$, $t_2-t_3$, $t_3-t_4$ and $t_4-t_1$ within each welding period. The reference 28 identifies a manually operated setting means for initially setting the control unit 23.

Figure 3:
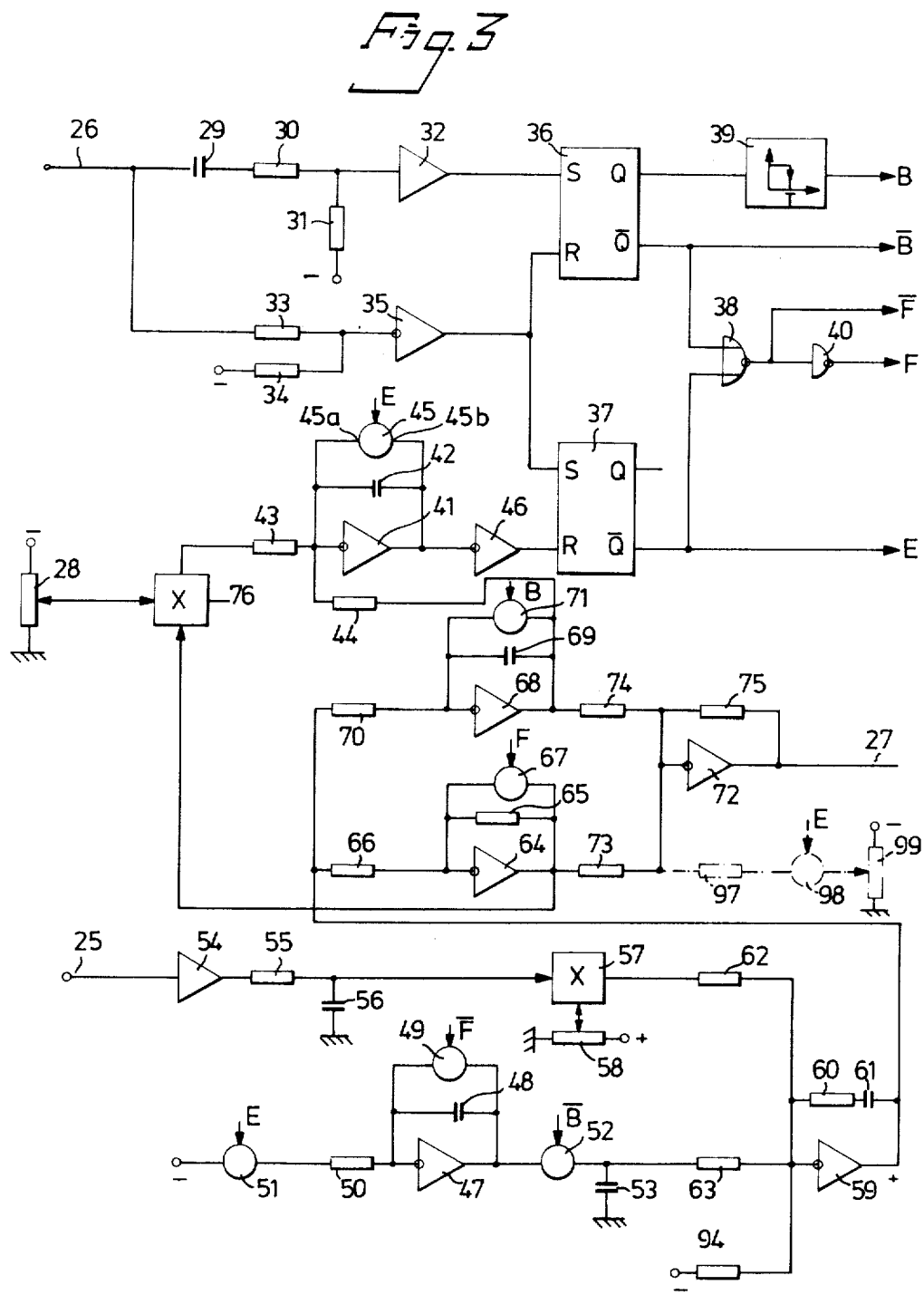
FIG. 3 is a diagrammatic representation of a first embodiment of the control unit incorporated in a welding apparatus according to the invention.

The control unit illustrated in FIG. 3 receives, over line 26, a voltage signal which coincides with the voltage present between an electrode 10 and the workpiece 11. The voltage signal is applied to a first discriminator circuit, comprising a derivation capacitor 29, a voltage divider formed by resistances 30 and 31, and an amplifier 32 which serves as a level discriminator. The voltage on line 26 is also applied to a second discriminator circuit comprising a second voltage divider formed by the resistances 33, 34 and an amplifier 35 which serves as a level discriminator and which has an inverted input. In the first discriminator circuit, the resistance 30 is connected in series with the capacitor 29, while the resistance 31 is connected between the output of the resistance 30 and a fixed, negative potential. The output of the resistance 30 is also connected to the input of the amplifier 32. The voltage signal is differentiated in the capacitor 29 and the resistances 30, 31 and the negative potential are selected such that the reversal point of the amplifier 32 is reached when a voltage surge or jump occurs on the line 26, said voltage jump being formed by the beginning of the arc interval. In this way, the amplifier 32 delivers a binary "one"-signal of short duration at the beginning of each arc interval. In a similar manner, the discriminator circuit 33, 34, 35 is arranged to detect a voltage $U_1$ (FIG. 1), said voltage being determined by the resistances 33, 34 and the fixed negative potential and indicating that a short circuit has occurred between the electrode 10 and the workpiece 11. In this way, the amplifier 35 delivers a binary "one"-signal, whenever the voltage on the line 26 is below the value $U_1$. The signals delivered by the amplifiers 32, 35 are applied to an RS flip-flop or bistable multivibrator 36. With a binary "one"-signal on the S-input, i.e., at the beginning of the arc interval, the flip-flop 36 is set to a condition in which the Q-output delivers a binary "one"-signal, while a "one"-signal on the R-input, i.e., at the beginning of the short-circuit interval will set the flip-flop 36 to a position in which the $\bar{Q}$-output delivers a binary "one"-signal. The signal from the amplifier 35 is also applied to the S-input of an RS flip-flop 37, the output signal E on the $\bar{Q}$-output of flip-flop 36 thus becoming a binary "zero"-signal. The R-input of the flip-flop 37 is arranged, by means hereinafter described, to receive a binary "one"-signal at the end of the arc interval $t_2$–$t_3$, whereby the output signal on the $\bar{Q}$-output of the RS flip-flop 37 comprises a binary "one"-signal during the rest interval $t_3$–$t_4$.

The $\bar{Q}$-output of the flip-flop 36 and the $\bar{Q}$-output of the flip-flop 37 are connected to the inputs of a NOR-circuit 38. The output of the NOR-circuit thus delivers a signal $\bar{F}$ which during the arc interval $t_2$–$t_3$ is a binary "one"-signal and during remaining intervals $t_3$–$t_2$ is a binary "zero"-signal. The output of the NOR-circuit 38 is connected to a logic NOR-circuit 40, which is used as an inverting circuit for inverting the received signal $\bar{F}$, such that the signal F leaving the NOR-circuit 40 comprises a binary "zero"-signal, whenever $\bar{F}$ is a binary "one"-signal and vice versa.

Connected to the Q-output of the RS flip-flop 36 is a switch-off time delay circuit 39, which functions in a manner such that when its input signal passes from a binary "one"-signal to a binary "zero"-signal, the output signal B will make the same signal conversion at a given time after the signal conversion has taken place on the input of circuit 39. This switch-off time delay circuit determines the controlled time delay $t_4$–$t_1$ according to FIG. 1 at the beginning of the short-circuit intervals. The output signal on the $\bar{Q}$-output of the RS flip-flop 36 is referenced $\bar{B}$.

By means of the signal on the line 26 and the signal on the R-input of the RS flip-flop 36 there are obtained the signals given in the logic table below, said signals adopting given levels depending upon the interval of the welding period within which the equipment is operating.

| Signal | $t_1$–$t_2$ | $t_2$–$t_3$ | $t_3$–$t_4$ | $t_4$–$t_1$ |
| --- | --- | --- | --- | --- |
| B | 0 | 1 | 1 | 1 |
| $\bar{B}$ | 1 | 0 | 0 | 1 |
| F | 1 | 0 | 1 | 1 |
| $\bar{F}$ | 0 | 1 | 0 | 0 |
| E | 0 | 0 | 1 | 0 | where:
$t_1$–$t_2$ = short-circuit interval
$t_2$–$t_3$ = arc interval
$t_3$–$t_4$ = rest interval
$t_4$–$t_1$ = time delay The aforementioned signals B, $\bar{B}$, F, $\bar{F}$ and E are used in the manner hereinafter described for controlling electronic switching elements in the control unit of the source of welding current.

A given relationship between the energy development during the short-circuit interval and the arc interval is produced by means of an integrator circuit comprising an operational amplifier 41, an integration capacitor 42, input resistances 43, 44 and an electronic switching element 45 controlled by the signal E. The element 45 functions in a manner such that when a binary "one"-signal is applied to the control input, contact is obtained between the two horizontal connections 45a and 45b in FIG. 3. It will be seen from the logic chart that E during the rest interval is a binary "one" which short circuits the integration capacitor 42, which results in the output signal from the amplifier 41 being zero volts. During the subsequent short-circuit interval, when the signal E is a binary "zero", the switching element 45 is opened and a negative control signal is applied to the input of the amplifier 41 via the resistance 44, said control signal being obtained from an integration amplifier 68, hereinafter described, and which during the short-circuit interval is proportional to the power-reference signal on the line 27 to the current source 15. The output signal of the integration amplifier 41, which is now positive, is then proportional to the energy which the source of current 15 delivers during the short-circuit interval. When the short-circuit interval passes to the arc interval, the signal from the integration amplifier 68 disappears and is replaced by a positive signal obtained from a multiplier circuit 76 through the resistance 43, said positive signal being proportional to the power reference signal on the line 27 during the arc interval. The output signal from the integration amplifier 41 will now be integrated in the negative sense, until the signal is zero. In this way, the output signal from the output of a level discriminator 46 connected to the integrator circuit 41–45 will pass from a binary "zero" to a binary "one" and activate the R-input of the RS flip-flop 37 connected to the output of the level discriminator 46, whereupon the output signal E on the $\bar{Q}$-output of said flip-flop, as aforedescribed, will be changed from a binary "zero" to a binary "one", which short circuits the capacitor 42 via the switching element 45.

Since the output signal from the integration amplifier 41 starts from zero, the amplifier 41 at the termination of the short-circuit interval has a voltage which is proportional to the energy delivered during said short-circuit interval, and since the integration time back to zero is proportional to the power delivered during the arc interval, there is obtained a definite relationship between the energy content of the short-circuit interval and the arc interval.

The relationship between short-circuit interval energy and arc interval energy can be readily adjusted by varying the strength of the output signal obtained from the multiplier circuit 76, said output signal being proportional to the power output during the arc interval. This is achieved by coupling one input of the multiplier circuit 76 to the output of an amplifier 64, which delivers a power reference signal to the current source 15 during the arc interval, and by coupling the other input of multiplier 76 to the output of the setting means 28, said setting means having the form of a potentiometer. The terminals of the potentiometer 28 are coupled between earth and a fixed negative potential, whereby the quotient between the output signal of the multiplier circuit 76 and the input signal from the amplifier 64 can be set by the potentiometer 28.

A signal which is proportional to the rest interval is generated by means of an integrator circuit, comprising an integration amplifier 47, an integration capacitor 48, an electronic switching element 49 which is controlled by the signal $\bar{F}$, and an input resistance 50. The input of the integrator circuit 47-50 is connected, through an electronic switching element 51 controlled by the signal E, to a fixed negative potential. During the rest interval the signal E is a binary "one", the element 51 connecting the fixed negative potential to the resistance 50. The output signal from the integration amplifier 47 is then integrated with a constant voltage derivative in the positive sense during the whole of the rest interval and, at the end of said rest interval, is proportional to the duration of said rest interval. The output signal of the integrator circuit 47-50 is delivered through an electronic switching element 52 controlled by the signal $\bar{B}$. The signal $\bar{B}$, which is a binary "one" during the short-circuit interval, couples the output signal from said integrator circuit 47-50 during said short-circuit interval, through the element 52, to a large capacitor 53 having a very long discharge-time constant. During the arc interval, the integration amplifier 47 is set to zero by the switching element 49 through the signal $\bar{F}$, which during said arc interval is a binary "one", at the same time as the switching element 52 is opened by the signal $\bar{B}$, which is a binary "zero" during the arc interval. Subsequent to each rest interval, the capacitor 53 will then be charged to a value which is proportional to the duration of a preceding rest interval.

A regulator for controlling the power output of the current source 15 comprises an operational amplifier 59 having a feedback circuit comprising a resistance 60 and an integration capacitor 61 and input resistances 62, 63 and 94. The regulator 59-63, 94 obtains a reference signal from a fixed negative potential via the resistance 94 and a response signal via the resistance 63 from the capacitor 53, the voltage of which is proportional to the duration of the rest interval. The output signal from the regulator is arranged to control the power output of the current source 15 in a manner such that the rest interval is controlled to a value predetermined by the resistance 94 and the negative potential. This control of the power output is obtained by the fact that the output signal of the regulator 59-63, 94 controls the power reference signal on the line 27 through circuits hereinafter described.

During the arc interval, the power reference signal is generated by the operational amplifier 64 with its feedback resistance 65 and series resistance 66, the values of the resistances 65, 66 determining the degree of amplification. Connected between the output of the amplifier 64 and its input is an electronic switching element 67 which is controlled by the signal F and which, as a result of the influence of said F signal, short-circuits the amplifier 64 and prevents it from delivering an output signal during all intervals with the exception of the arc interval. During the short-circuit interval, the power reference signal is generated by an integrator circuit comprising the operational amplifier 68 with associated integration capacitor 69 and resistance 70, the speed of integration being determined by the value of the resistance 70 and the capacitor 69. An electronic switching element 71 controlled by the signal B is connected between the input of the amplifier 68 and its output and prevents the amplifier 68 from delivering a signal, except during the short-circuit interval.

The reference signals obtained from the amplifiers 64, 68 are totalled in a summation circuit comprising an operational amplifier 72, a feedback resistance 75 and input resistances 73 and 74, each of which is connected to an output of a respective amplifier 64 and 68. The amplifier 72 consequently delivers a power reference signal on the line 27 during both the short-circuit interval and the arc interval and delivers a "zero"-signal during the rest interval.

If desired, the control unit illustrated in FIG. 3 can be complemented with a circuit by which the duration of the rest interval is automatically changed in dependence upon the speed at which the additive material 10 is fed to the weld location. This can be effected by using the signal taken out on line 25, which signal constitutes a measurement of the current fed to the weld location and which signal is approximately proportional to the rate of the feed of the additive material. The signal 25 is amplified from the $\mu$V-level to the V-level by means of an amplifier 54 and is filtered in an L-filter comprising a resistance 55 and a capacitor 56. The strength of the amplified and filtered signal can then be adjusted by means of a potentiometer 58, which is coupled between earth and a fixed positive potential and the output of which is coupled to one input of a multiplier circuit 57. Thus, the output signal from the said multiplier circuit 57 can be adjusted from zero upwards by means of the potentiometer 58. The signal from the multiplier circuit 57 is coupled to the input of the control amplifier 59 via the resistance 62.

It also lies within the scope of the invention to vary the power output of the current source 15 during the arc interval in the absence of any actual rest interval, for example by lowering said power output during the latter part of an arc interval, e.g., to a value of such low magnitude that substantially no additive material is supplied to the weld location during the latter part of said arc interval, while at the same time avoiding burning of the additive material wire onto the welding nozzle and cooling of the outer end of said wire. As an example of this possibility there is indicated in FIG. 3 a circuit which is coupled between the input of the amplifier 72 and an optionally adjustable potentiometer 99 and which comprises a resistance 97 and an electronic switching element 98 controlled by the signal E. In this way, the amplifier 72 will, of course, be applied with a signal whose level is somewhat higher than the signal intended for the setting of the potentiometer 28, but this will be of little consequence and can, if so desired, be substantially corrected by setting the potentiometer 28 to a correspondingly low level.

Figure 4:
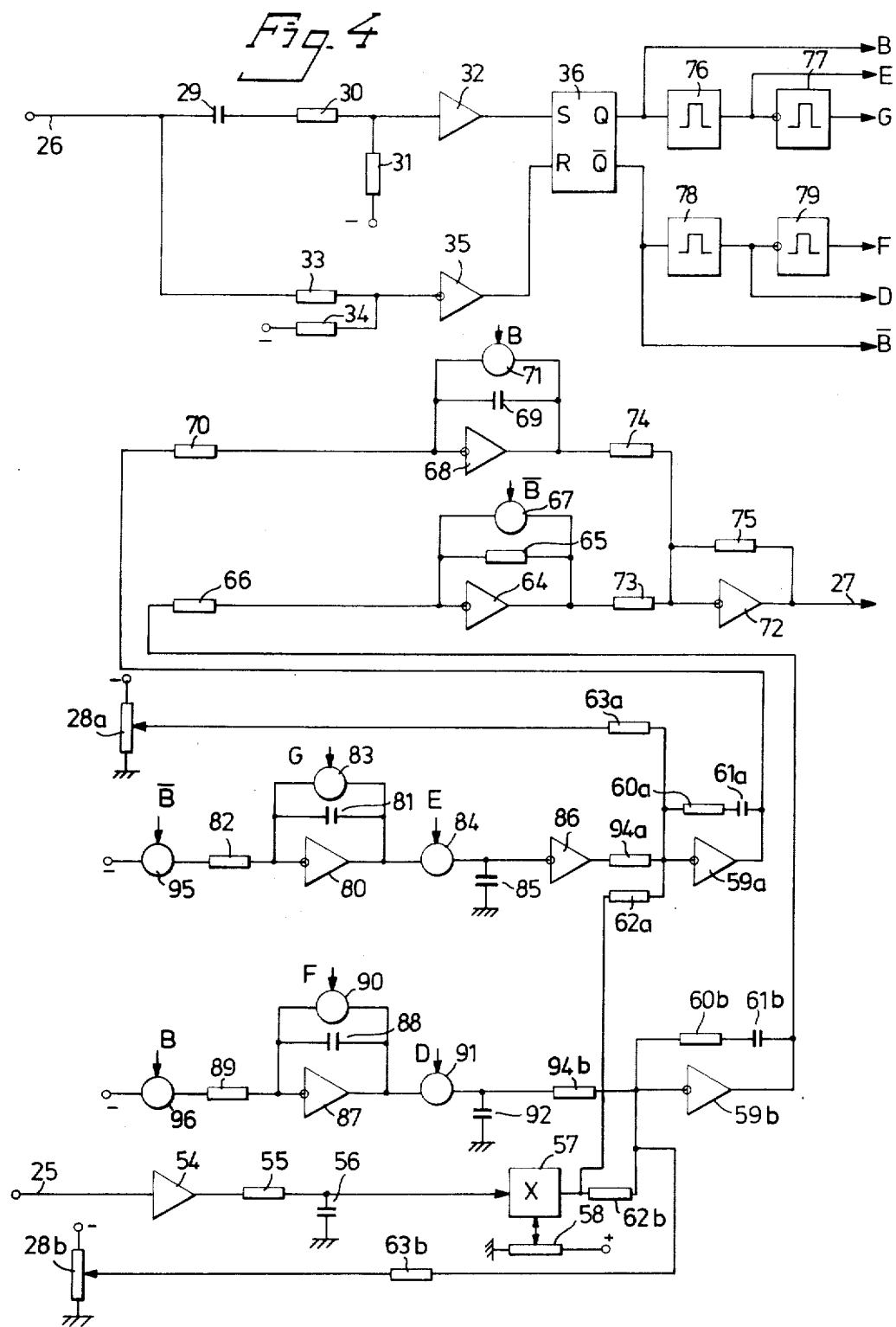
FIG. 4 is a diagrammatic representation of a second embodiment of a control unit incorporated in a welding apparatus according to the invention.

Similar to the control unit illustrated in FIG. 3, the control unit shown in FIG. 4 is provided with input lines 25, 26 for signals corresponding to the voltage and current respectively, and an output line 27 for a power reference signal controlling the current source 15. Further, the control unit comprises a first detecting circuit, comprising the components 29–36, a second detecting circuit, comprising the components 54–58, and a circuit, comprising the components 64–75, for producing a power reference signal. Said circuits are equivalent to the circuits 29–36, 54–58, and 64–75 illustrated in FIG. 3, and will therefore not be described in detail with reference to FIG. 4.

As illustrated in FIG. 4, the signals B and B from the outputs Q and Q̄ of the RS flip-flop 36 each activate a respective one of two monostable flip-flops 76 and 78, which are triggered in a manner such that they deliver on their outputs, signals E and D in the form of short-duration binary "one"-signals when the inputs of the flip-flops pass from a binary "zero" to a binary "one". The signals E and D obtained from the flip-flops 76 and 78 are also applied to two further monostable flip-flops 77 and 79 which differ from the flip-flops 76 and 78 by the fact that they are arranged to be triggered such as to deliver short-duration binary "one"-signals G and F on their outputs when their inputs pass from a binary "one" to a binary "zero".

The signals B, E, G, F, D and B̄ will occur in accordance with the following: when the beginning of an arc interval is detected through the level discriminator 32, the Q-output of the RS flip-flop 36, i.e., the B-signal, will pass from a binary "zero" to a binary "one". The B̄-signal, which is the inverse of the B-signal, will thus simultaneously pass from a binary "one"-signal to a binary "zero"-signal. At the same time as the B-signal passes to a binary "one"-signal there occurs a short-duration signal pulse E which, when it ends, triggers the monostable flip-flop 77 in a manner such that a short-duration "one"-signal G is obtained on the output. When the Q̄-output of the RS flip-flop 36 passes from a binary "one" to a binary "zero" the F-signal and D-signal are not influenced. When the beginning of a short-circuit interval is detected through the level discriminator 35, the B̄-signal will pass from a binary "zero"-signal to a binary "one"-signal, the B-signal becoming the inverse of the B̄-signal. At the same time the D-signal and F-signal will obtain the form of sequential pulses, in the same manner as that described with reference to the signals E and G above, when the beginning of the arc interval was detected.

A signal which is proportional to the duration of the short-circuit interval is generated in an integrator circuit comprising an operational amplifier 80, an integration capacitor 81 and an input resistance 82. The input signal to the resistance 82 is obtained from a fixed potential via an electronic switching element 95 controlled by the signal B̄ and which is closed during the short-circuit interval. The output signal from the integration amplifier 80 then increases with a constant slope and, at the termination of the short-circuit interval, is proportional to the duration of said short-circuit interval. An electronic switching element 84 controlled by the signal E permits, at the termination of the short-circuit interval, charging of a capacitor 85, which is connected downstream of the integrator circuit 80–82, to a potential corresponding to the duration of the short-circuit interval, whereafter the integration capacitor 81 is short-circuited by means of an electronic switching element 83 controlled by the signal G, the output signal from the amplifier 80 becoming zero. An amplifier 86 having an inverted input and being coupled downstream of the capacitor 85 inverts the signal from the capacitor 85.

In a similar manner there operates a second integration circuit which comprises an operational amplifier 87, an integration capacitor 88 and resistance 89 having associated electronic switching elements 96, 90 and 91 controlled by respective signals B, F and D and a capacitor 92, the input signal to the resistance 89 being obtained from a fixed potential during the arc interval via the element 96 which is closed during said arc interval by means of the signal B. The element 91 controlled by the signal D permits, at the termination of the arc interval, charging of the downstream-coupled capacitor 92 to a potential which corresponds to the duration of the arc interval, whereafter the integration capacitor 88 is short-circuited by the switching element 90 controlled by the signal F, the output signal from the amplifier 87 becoming zero.

A first regulator, arranged to control the power output of the power source 15 through the circuit comprising components 65–78 during the short-circuit interval, comprises an operational amplifier 59a having a feedback circuit comprising a resistance 60a and an integration capacitor 61a and resistances 62a, 63a and 94a. Connected to the input of the amplifier 59a is a setting means 28a in the form of a potentiometer. The regulator 59a–63a, 94a will deliver an output signal which, through circuits 64–75, will control the source of welding current 15 and therewith the detecting circuit 29–36 with associated flip-flops 76–79 during the short-circuit interval in a manner such that the signal present on the output of the amplifier 86 and applied to the amplifier 59a through the resistance 94a is proportional to the signal obtained from the potentiometer 28a. Hence, the duration of the short-circuit interval can be adjusted to the desired magnitude by means of the potentiometer 28a.

A further regulator for controlling the power output of the current source 15 during the arc interval, via the circuits 64–75, comprises an operational amplifier 59b having a feedback circuit comprising a resistance 60b and an integration capacitor 61b and resistances 62b, 63b and 94b. Connected to the input of the amplifier 59b is a second setting means 28b in the form of a potentiometer. Consequently, the regulator 59b–63b, 94b will deliver an output signal which, during the arc interval, will control the source 15 of welding current through the circuit 64–75, and therewith also the detecting circuit 29–36 with associated flip-flops 76–79 in a manner such that the signal delivered by the capacitor 92 will be proportional to the signal obtained from the potentiometer 28b. Hence, the duration of the arc interval can be set to the desired value by means of said potentiometer 28b.

The duration of the short-circuit intervals and the arc intervals can also be corrected automatically with respect to the speed at which the additive material is fed to the welding location, by applying to the control amplifiers 59a, 59b a correction signal which is proportional to the mean value of the current supplied to the welding location. This correction signal is applied from the output of the multiplier circuit 57 through the resistances 62a and 62b of respective regulators 59a–63a, 94a and 59b–63b, 94b. The correction signal is obtained from the signal incoming on line 25, this latter signal being proportional to the current at the weld location, said incoming signal being amplified, filtered and multiplied in substantially the same manner as that previously described with reference to components 54 and 58 in FIG. 3. In this way, it is possible to lengthen or shorten the duration of the short-circuit intervals and the arc intervals when the speed at which the additive material is fed to the weld location increases.

What is claimed is:

1. An apparatus for short-arc welding comprising a controllable current source, means for controllably feeding a wire-like consumable electrode of additive material to a weld location, and a control unit for automatically adjusting the current source in dependence upon the welding sequence, said current source being arranged to provide welding periods divided into short-circuit intervals, arc intervals and optional rest intervals, characterized in that the control unit includes adjusting means for adjusting the power output delivered by the current source in response to variations of the duration from a reference duration of at least one of said intervals in a sequence of welding periods to cause said at least one interval to return to said reference duration.

2. An apparatus according to claim 1, characterized in that said means for adjusting comprises means responsive to variations in said short-circuit interval for controlling the power output during the short-circuit intervals, and means responsive to variations in said arc interval for controlling the power output during the arc intervals.

3. An apparatus according to claim 2 characterized by means for adjusting the reference duration of said short-circuit interval as a function of the speed at which the additive material is fed to the weld location.

4. An apparatus according to claim 2 characterized by means for adjusting the reference duration of said arc interval as a function of the speed at which the additive material is fed to the weld location.

5. An apparatus according to claim 2 characterized by means for adjusting the reference durations of said short-circuit interval and said arc interval as a function of the speed at which the additive material is fed to the weld location.

6. An apparatus according to claim 1, wherein said means for adjusting comprises means responsive to variations in said rest interval for controlling the power output during at least one of said short-circuit and arc intervals.

7. An apparatus according to claim 6 wherein said last mentioned means controls the power output during both said short-circuit and arc intervals.

8. An apparatus according to claim 7 having means for positively creating a rest interval prior to each short-circuit interval.

9. An apparatus according to any of claims 6, 8 or 7 characterized by means for adjusting the reference duration of said rest interval as a function of the speed at which the additive material is fed to the weld location.

10. An apparatus according to claim 1 characterized by means for adjusting the reference duration of said at least one of the short-circuit intervals, the arc intervals and the rest intervals as a function of the speed at which the additive material is fed to the weld location.

11. An apparatus according to claim 1, characterized in that the control unit includes means for closing the current to the weld location at a predetermined time after a short-circuit has taken place.

12. An apparatus according to claim 1, characterized by a capacitor which is coupled between the wire electrode and the weld location parallel to the welding-current path.

13. An apparatus according to claim 1, characterized in that said control unit includes means for adjusting the arc interval energy in a manner such that it constitutes a predetermined function of the short-circuit interval energy.

14. An apparatus for short-arc welding comprising a controllable current source, means for controllably feeding a wirelike consumable electrode of additive material to a weld location, and a control unit for automatically adjusting the current source in dependence upon the welding sequence, said current source being arranged to provide welding periods divided into short-circuit intervals, arc intervals and optional rest intervals, characterized in that the control unit includes adjusting means for adjusting the power output delivered by the current source, said adjusting means comprising:

(a) means for setting a reference value for at least one of said short-circuit, arc, and rest intervals, and (b) feedback means responsive to variations in the duration of the interval or intervals for which a reference level is set for controlling the power output to cause said interval or intervals to return to said reference value or values.

15. The apparatus of claim 14 wherein the means for setting sets a reference value for said rest interval, and said feedback means responds to variations in said rest intervals for controlling the power output during said short-circuit and arc intervals.

16. The apparatus of claim 15 wherein said adjusting means comprises;

(a) amplification circuit means operative during said arc interval for providing a power reference output signal which determines the power delivered to the weld during the arc interval, (b) integrator circuit means operative during said short-circuit interval for providing a power reference output signal which determines the power delivered to the weld during said short-circuit interval, (c) an operational amplifier having its output applied to said amplification circuit and said integrator circuit, (d) said means for setting a reference value comprising a first reference voltage connected as one input to said operational amplifier, and (e) said feedback means comprising means for integrating a second reference voltage over the period of said rest interval and applying the final output therefrom to said operational amplifier.

17. The apparatus of any of claims 15 or 16 further comprising means responsive to the feed rate of said wire for altering the reference value of said rest interval.

18. The apparatus of claim 15 wherein said control unit further comprises means for maintaining the arc current at a low non-zero level during the rest interval.

19. The apparatus of claim 14 wherein the means for setting sets a reference value for said short-circuit interval and a reference value for said arc-interval and said feedback means responds to variations in said short-circuit interval for controlling the power output during said short-circuit interval and responds to variations in said arc interval for controlling the power output during said arc interval.

* * * * *